Aug. 11, 1970   S. L. BALDWIN ET AL   3,524,051
LUMINAIRE
Filed Aug. 19, 1968   5 Sheets-Sheet 1
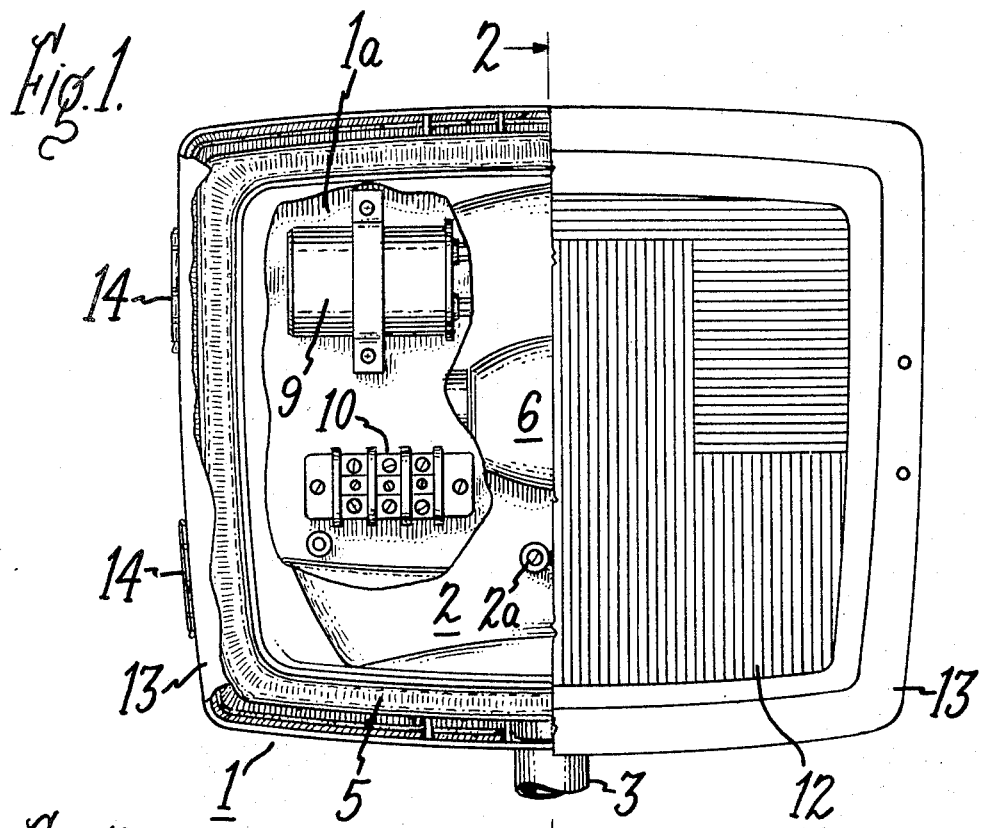
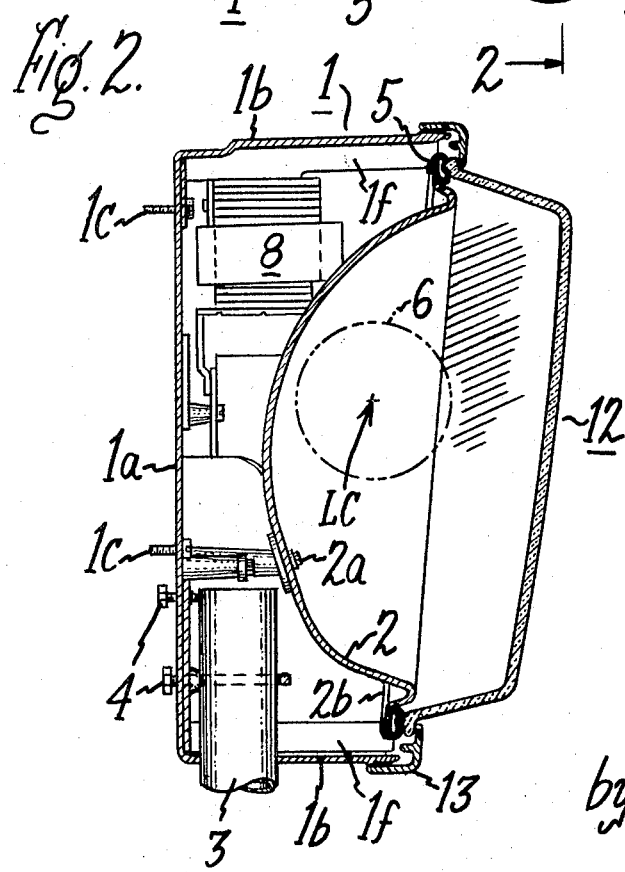
Inventors,
David L. Wood,
Samuel L. Baldwin,
by Sidney Greenberg
Their Attorney.

Aug. 11, 1970   S. L. BALDWIN ET AL   3,524,051

LUMINAIRE

Filed Aug. 19, 1968                         5 Sheets-Sheet 2

Inventors,
David L. Wood,
Samuel L. Baldwin,
by Sidney Greenberg
Their Attorney.

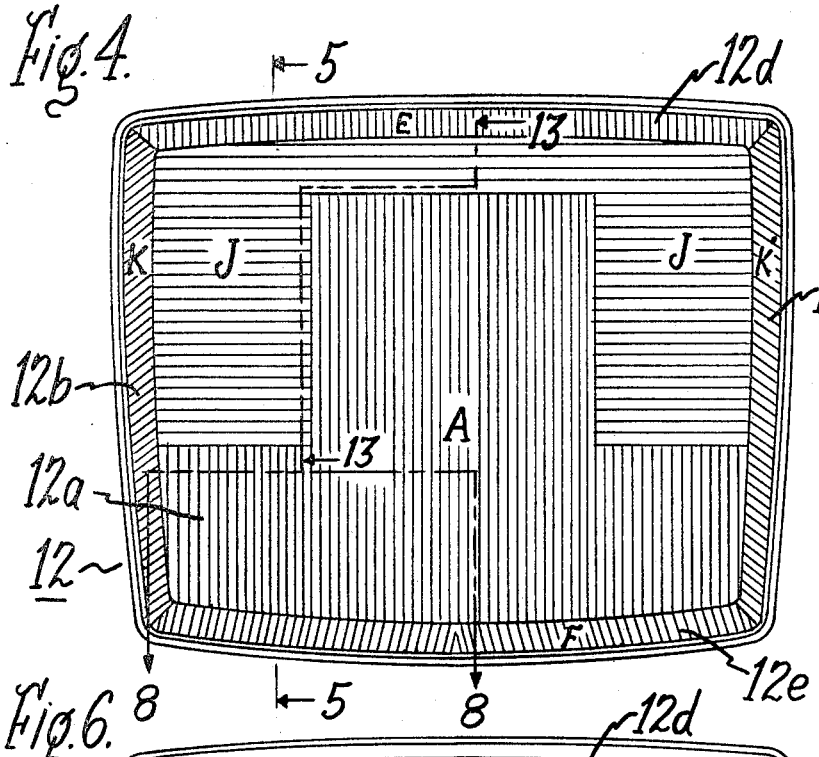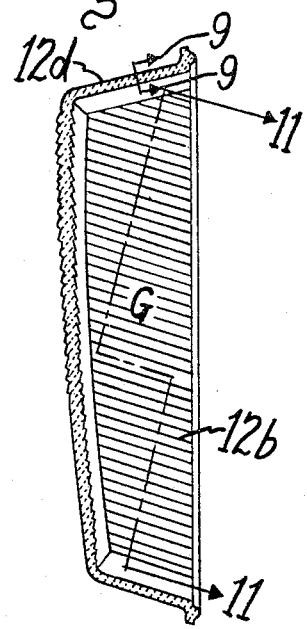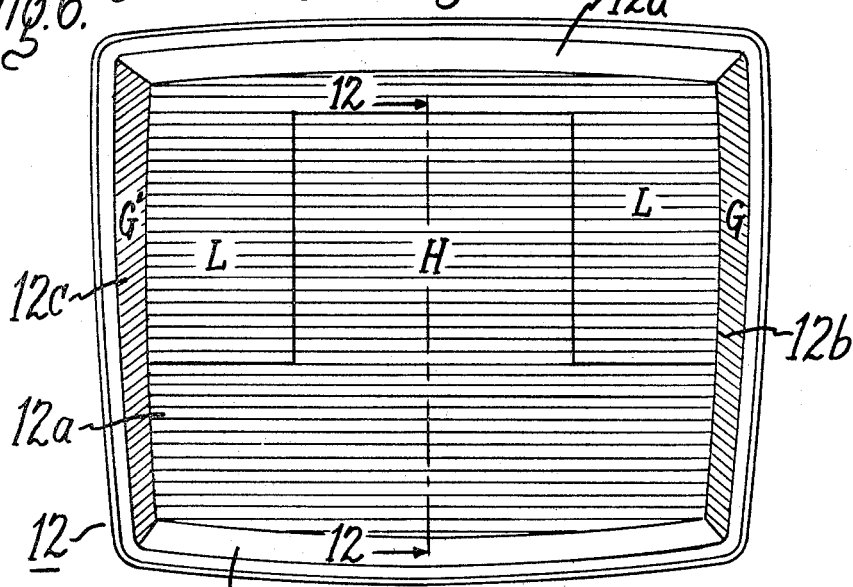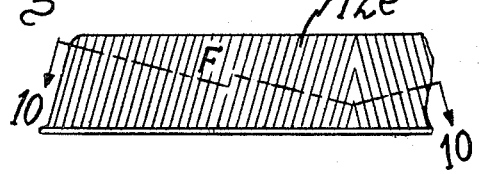

Inventors,
David L. Wood,
Samuel L. Baldwin,
by Sidney Greenberg
Their Attorney.

Aug. 11, 1970   S. L. BALDWIN ET AL   3,524,051
LUMINAIRE
Filed Aug. 19, 1968   5 Sheets-Sheet 5
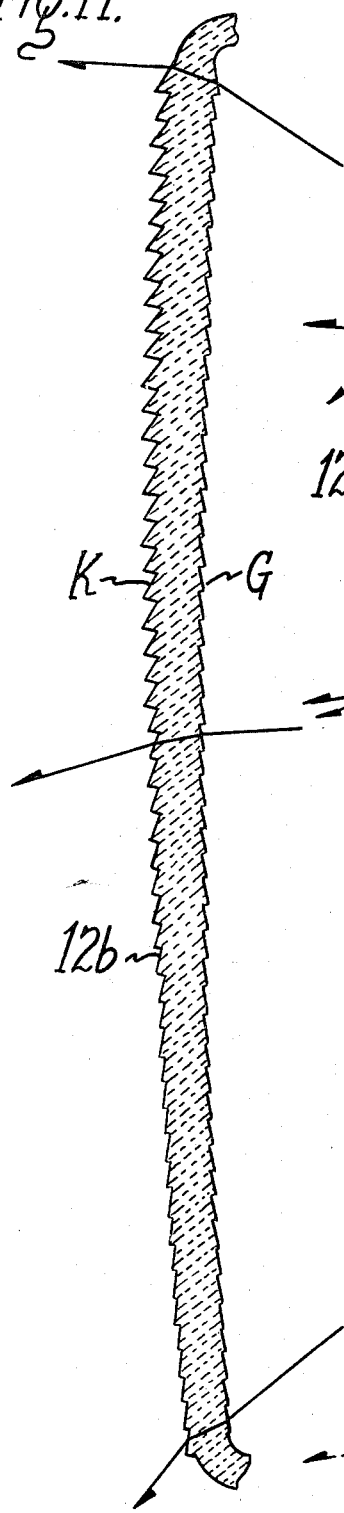
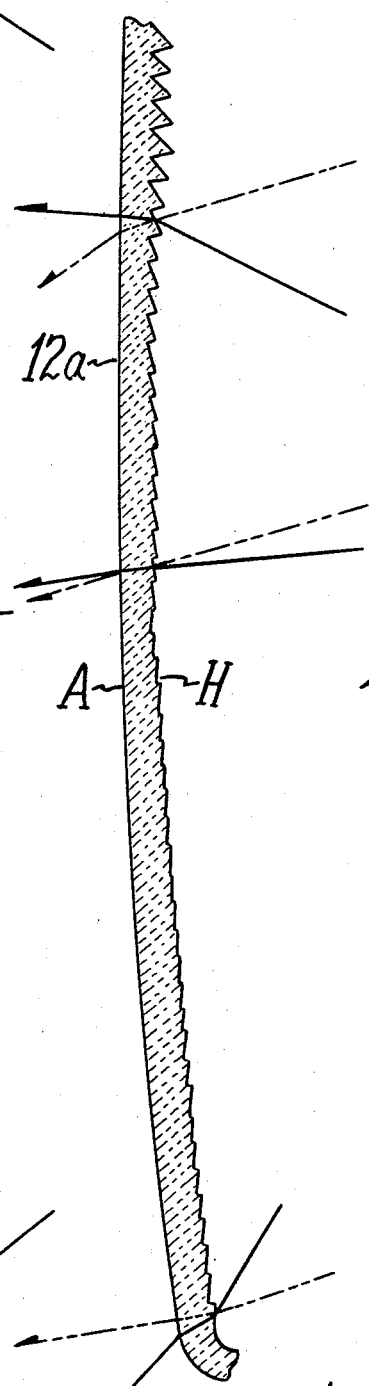
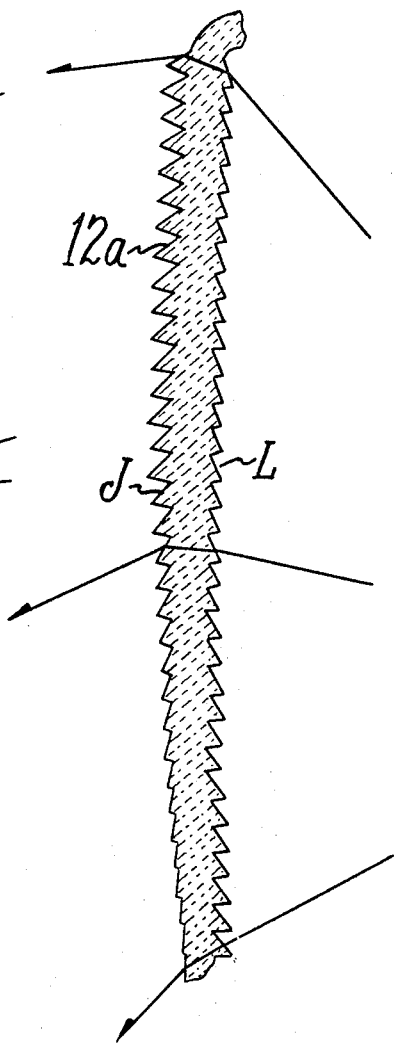
Inventors,
David L. Wood,
Samuel L. Baldwin,
by Sidney Greenberg
Their Attorney.

United States Patent Office 3,524,051
Patented Aug. 11, 1970

3,524,051
LUMINAIRE
Samuel L. Baldwin, Flat Rock, and David L. Wood, Hendersonville, N.C., assignors to General Electric Company, a corporation of New York
Filed Aug. 19, 1968, Ser. No. 753,566
Int. Cl. F21s 1/10
U.S. Cl. 240—25      13 Claims

ABSTRACT OF THE DISCLOSURE

A luminaire of generally rectangular shape for mounting in either vertical or horizontal positions. The luminaire is comprised of a box-like housing providing a paraboidal reflector mounted behind a light source within the housing and an open front that is closed by a removable rectangular refractor. The refractor provides front, top, bottom and opposite side prismatic panels that redirect light incident thereon from the light source and reflector. The refractor has a front panel formed with a centrally arranged prismatic sector which extends upwardly from the bottom of the panel and is wider at the bottom than it is at the top. This centrally arranged portion has opposite inner and outer surfaces. One surface is formed with vertical refracting prisms while the opposite surface is formed with horizontal prisms. The remaining portion of this front panel is formed with horizontal refracting prisms on both opposite surfaces. The luminaire is constructed and arranged to distribute light uniformly in a rectangular pattern on the surface to be illuminated.

---

The present invention relates to luminaires, and particularly concerns luminaires of the underpass type which may be mounted on a vertical wall for illuminating roadway surfaces adjacent the luminaire.

It is an object of the invention to provide a luminaire adapted to be mounted in different positions for illuminating surfaces at right angles to the plane thereof.

It is another object of the invention to provide a luminaire of the above type which produces a high degree of uniformity of illumination on the illuminated surface.

A further object of the invention is to provide a luminaire of the above type suitable for use as an underpass luminaire when mounted in a vertical position and for sign lighting when mounted in a horizontal position.

It is another object of the invention to provide a luminaire of the above type which provides effective utilization of the light and avoids glare to approaching motorists.

Other objects and advantages will become apparent from the following description and the appended claims.

With the above objects in view, the present invention relates to a luminaire comprising, in combination, a box-like housing having a rear wall and forwardly projecting side walls defining a rim edge at the open front of the housing, a reflector mounted in the housing, a light source arranged in the housing in front of the reflector and having a light center spaced inwardly of the housing rim edge, a refractor removably secured to the housing closing the open front thereof and re-directing light passing therethrough from the light source and the reflector, the refractor having a front panel formed with a centrally arranged prismatic sector extending upwardly a substantial distance from the bottom of the front panel and being wider at its lower portion than at its upper portion, the centrally arranged prismatic sector having opposite inner and outer surfaces and being formed with vertical refracting prisms on one of the surfaces and with horizontal refracting prisms on the opposite surface, the remaining portions of the front panel having horizontal refracting prisms on opposite surfaces.

The invention will be better understood from the following description taken in conjunction with the accompanying drawings, in which:

FIG. 1 is a front view in elevation of a luminaire embodying the invention, with parts of the luminaire broken away to show the interior of the housing;

FIG. 2 is a cross-sectional view of the FIG. 1 luminaire taken along the line 2—2;

FIG. 4 is a front elevational view of the refractor showing the prismatic sectors on the external surfaces;

FIG. 5 is a cross-sectional view of the refractor taken along the line 5—5 of FIG. 4;

FIG. 6 is a rear elevational view of the refractor showing the prismatic sectors on the inner surfaces thereof;

FIG. 7 is an external plan view of a portion of the bottom refractor panel;

FIG. 11 is a cross-sectional view of a side panel of the refractor taken along the line 11—11 of FIG. 5;

FIG. 12 is a cross-sectional view of a portion of the front panel of the refractor taken along the line 12—12 of FIG. 6;

FIG. 13 is a cross-sectional view of a portion of the front panel of the refractor taken along the line 13—13 of FIG. 4.

Figure 3:
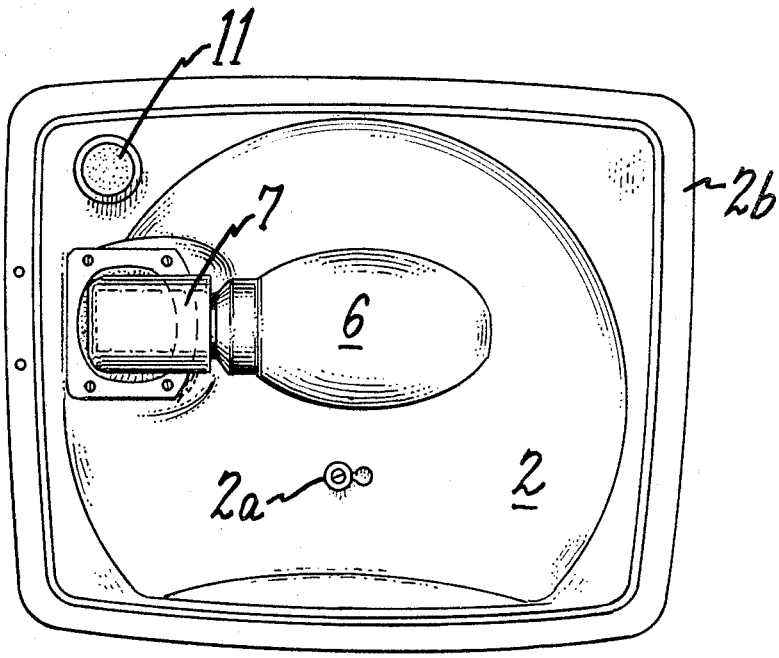
FIG. 3 is a front elevational view of the luminaire reflector with associated lamp.

Referring now to the drawings, and particularly to FIGS. 1 and 2, there is shown a luminaire of generally rectangular shape comprising a box-like housing 1 having a rear wall 1a and forwardly projecting walls 1b defining a rim edge at the open front of the housing which in the illustrated embodiment lies in a plane tilted downwardly somewhat from the vertical as shown in FIG. 2. The lower rear portion of housing 1 is formed with a mounting socket or slipfitter for mounting the luminaire on a pipe support 3, with suitable clamp means 4 for securing the housing to support 3. Mounted within housing 1 is a concave reflector 2 secured by suitable means such as a screw 2a to a boss projecting from the rear wall of the housing. Reflector 2 is preferably in the form of a truncated paraboloid having its axis inclined downwardly, which, in a typical vertical arrangement of the luminaire as shown in FIG. 2, slants downwardly from the horizontal at an angle of about 22°, resulting from the 17° downward inclination of the paraboloidal reflector axis plus the 5° downward tilt of the housing rim against which the reflector 2 is mounted. As seen in FIGS. 1 and 2, reflector 2 has a flat surrounding flange 2b on which is positioned a circumferential resilient gasket 5 and which rests against ribs 1f formed on the walls of housing 1. Lamp 6, which typically is of the gaseous discharge type such as a mercury or sodium vapor lamp, is arranged in front of reflector 2 (see FIG. 3) with its base threaded into lamp holder 7 which extends through an aperture at one side of the reflector to the rear thereof and is suitably secured to the rear side of the reflector. As seen in FIG. 2, lamp 6 having a light center LC is elongated with its axis arranged generally parallel to the rear wall and is located substantially within the side walls of housing 1, with the result that very little, if any, direct light therefrom passes laterally out of the housing, i.e., in directions substantially parallel to the rear housing wall.

In the remaining space in housing 1 to the rear of reflector 2 are mounted electrical components for operating lamp 6, including ballast transformer 8, capacitor 9 and terminal board 10, all of which are suitably secured to the rear housing wall. The electrical components are suitably interconnected by conductors (not shown).

Closing the open front of housing 1 is a box-like refractor 12 having (see FIG. 4) a front panel 12a, opposite side panels 12b and 12c, top panel 12d and bottom panel 12e. Refractor 12 is mounted in frame 13 (see FIGS. 1 and 2) which is hinged at one side to housing 1 by means of upper and lower hinges 14 and latched at the opposite side by suitable latch means (not shown). The structure and operation of the frame hinges and latch means and other features of the luminaire are more fully disclosed in co-pending application Ser. No. 753,672, filed Aug. 19, 1968, in the names of Wood and Abercrombie and assigned to the same assignee as the present invention, and the disclosure of the co-pending application is incorporated herein by reference.

In its closed position, as shown in FIG. 2, the rim of refractor 12 engages gasket 5 on reflector 2 around its entire extent and thereby forms with reflector 2 a sealed optical system enclosing lamp 6 and the reflecting surface of reflector 2. As seen in FIG. 3, an air purifying filter 11 is inserted in an aperture in reflector 2 for filtering the air passing into the otherwise sealed optical system, the filter being of the type, for example, disclosed in Franklin et al. Pat. 3,353,015.

The described luminaire is versatile in its ability to be mounted in various ways. Thus, it may be mounted on a vertical surface by means of bolts 1c passing through apertures in rear wall 1a of the housing or by means of the bottom slipfitter on a hollow conduit or pipe 3 for illuminating underpass roadways or the grounds around buildings, or it may be horizontally mounted by the same means with refractor 12 facing upwardly for lighting vertical signs or walls. In such use the luminaire, by virtue of its optical system as described more fully hereinafter, serves to illuminate the desired surface in a relatively uniform manner, such that the illumination produced has a maximum to minimum uniformity ratio less than one-half that which is typical of luminaires heretofore employed for similar purposes.

Figure 8:
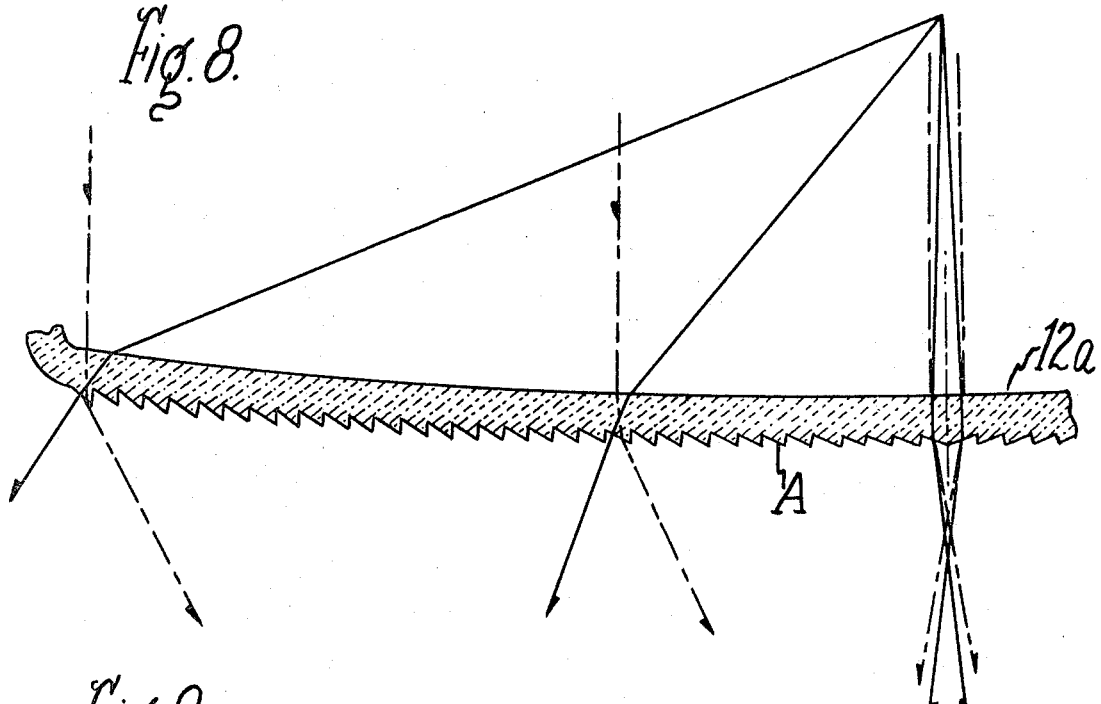
FIG. 8 is a cross-sectional view of a portion of the front panel of the refractor taken along the line 8—8 of FIG. 4.

In accordance with the invention, refractor 12 is formed with prismatic sectors having particular light control and directing functions to produce the desired illumination pattern and distribution. As seen in FIG. 4, front panel 12a has an inverted T-shaped external prism sector A having a wide portion at the bottom and a narrower leg portion extending upwardly therefrom. Sector A comprises vertical prisms which, as shown, are aligned in parallel rows extending from top to bottom of this sector. As seen in FIG. 8, which shows a cross-section of prism sector A, the vertical prisms of this sector have increasing refractive power from the center of the luminaire toward the opposite sides so as to bend the direct light rays (shown in continuous lines) and the reflected light rays (shown in dashed lines) into the desired light pattern. In the leg portion of sector A the vertical prisms are of generally increasing refractive power from upper to lower portions, such that the light rays passing through the upper portions are bent inwardly toward the center less than those in the lower portions. In his way, there is avoided the undesirable concentration of light in the central portions of the illuminated area which are nearer the luminaire.

Internal prism sector H, as seen in FIG. 6, is co-extensive with external prism sector A and is formed with horizontal prisms. The arrangement and form of the latter, as shown in the cross-sectional view of FIG. 12, are such that the prisms on the upper half depress in varying degrees the direct and reflected light incident thereon, while the lower half prisms lift the light rays in varying degrees. These prisms increase in refractive power from the center to top and bottom respectively. Thus, while external sector A primarily controls the horizontal distribution of the light emanating therefrom, internal sector H controls the vertical distribution of the same light, and these sectors A and H thus co-act to produce the desired light distribution for the reflected and direct light rays passing therethrough.

The inverted U-shaped prism sector J which adjoins sector A and forms the remainder of the external refractor panel 12a is comprised of horizontal prisms which, as shown in the crosss-ectional view of FIG. 13, have gradually increasing light depressing power toward the upper portions.

On the rear of front panel 12a, prism sector L, which is co-extensive with external sector J, is formed of horizontal prisms which are arranged to receive direct light from lamp 6 and serve in conjunction with the prisms of external sector J to generally depress the incident direct light rays, as shown in FIG. 13.

The side panels 12b and 12c of refractor 12 each comprise parallel light depressing prisms on opposite surfaces including respectively external prism sectors K and K' and co-acting internal prism sectors G and G' as shown in FIG. 11, and in these sectors the prisms have increasing refractive power toward the top. As seen in FIG. 5, these prisms incline downwardly from front to rear at an angle of about 15° relative to the horizontal. The prisms on side panels 12b and 12c are thus arranged and constructed to receive direct light from the lamp and project it downwardly and slightly forwardly relative to the luminaire.

Figure 9:
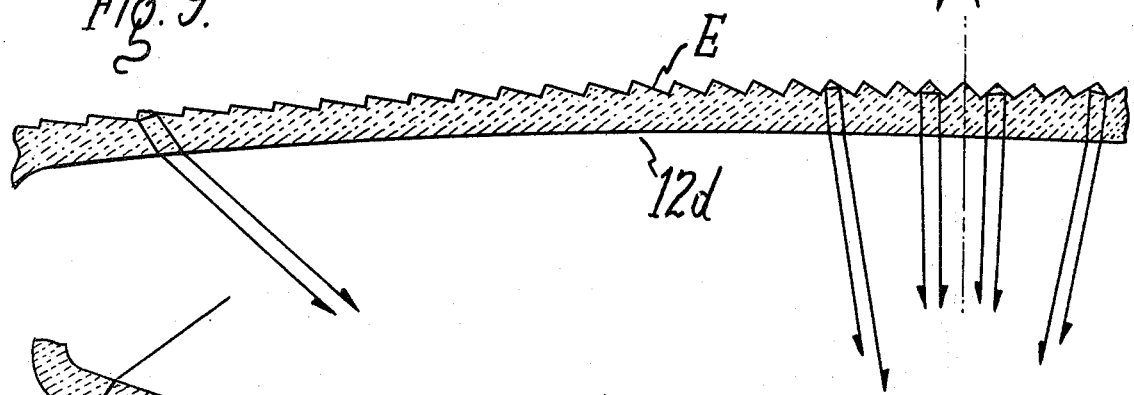
FIG. 9 is a cross-sectional view of a portion of the top panel of the refractor taken along the line 9—9 of FIG. 5.

Top panel 12d of the refractor comprises external prism sector E formed with parallel rows of reflecting prisms which, as shown in FIG. 9, are constructed and arranged to receive direct light from the lamp and re-direct it in the opposite direction, so as to minimize the light transmitted outwardly through this panel. By virtue of this reflecting prism arrangement, when the luminaire is arranged in a horizontal position for lighting vertical signs adjacent to the roadway, for example, transmission of light through panel 12d toward an approaching motorist is largely avoided. As seen in FIG. 9 the parallel reflecting prisms of panel 12d on opposite sides of the vertical center line of the refractor are oriented in opposite directions.

Figure 10:
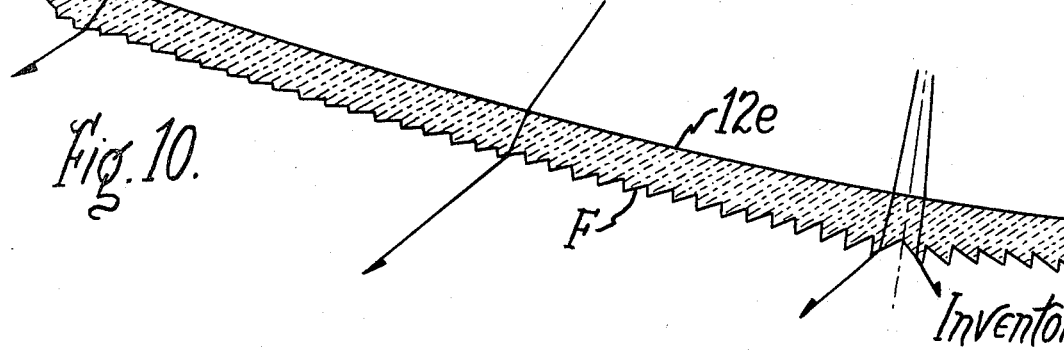
FIG. 10 is a cross-sectional view of a portion of the bottom panel of the refractor taken along the line 10—10 of FIG. 7.

Bottom panel 12e of refractor 12 (see FIG. 4) is formed on its external surface with prism sector F formed of refracting prisms which (see FIG. 10) increase in refracting power from the sides of the refractor toward the center of the panel. These prisms, which are arranged in divergent rows on opposite sides of the center line of the refractor (see FIG. 7) receive direct light from the lamp and sweep it toward the sides and forwardly of the luminaire to avoid concentration of the direct light below the luminaire.

Figure 14:
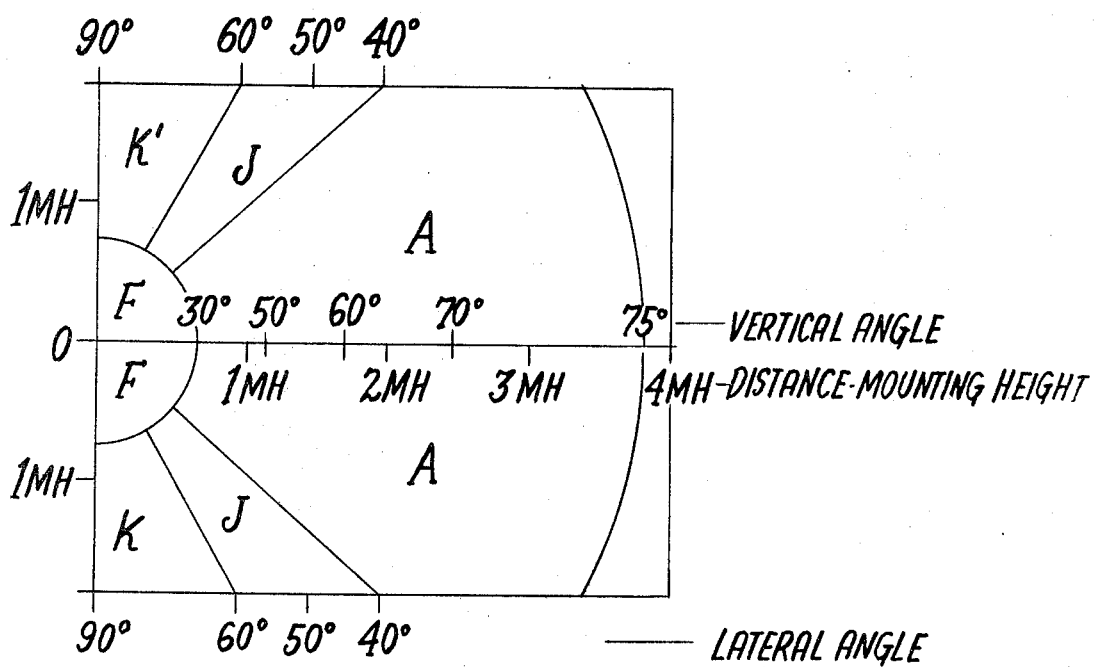
FIG. 14 is a chart showing light placement produced by the luminaire of the invention.

The luminaire thus described when mounted on a vertical surface such as the wall of an underpass will provide a generally rectangular pattern of light on the adjacent roadway surface as shown by the light placement chart of FIG. 14, wherein the light distribution pattern on the roadway is depicted. In the chart, the placement of light from specific refractor sectors is shown. Letters designating the various pattern areas correspond to the prism sectors of the refractor from which the light emanates. Thus, sector F in the left center of the chart nearest the luminaire O represents the area receiving light emanating from prism sector F on the bottom panel of refractor 12, whereas the chart regions marked A are those receiving light passing through the coacting prism sectors A and H. Distances forward and laterally from the luminaire O are indicated in terms of multiples of the mounting height (MH) of the luminaire above the roadway surface. Vertical angles and lateral angles of the light rays from the luminaire are also indicated in the chart. The distribution of light in the pattern indicated provides, as previously mentioned, a relatively uniform light intensity throughout the illuminated surface. As will be understood, with the luminaire arranged horizontally to illuminate a vertical surface such as a sign, the FIG. 14 chart will correspond to the light pattern projected on such a vertical surface also.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What we claim as new and desire to secure by Letters Patent of the United States is:

1. A luminaire comprising, in combination, a box-like housing having a rear wall and forwardly projecting sidewalls defining a rim edge at the open front of said housing, a reflector mounted in said housing, a light source arranged in said housing in front of said reflector and having a light center spaced inwardly of said housing rim edge, a refractor removably secured to said housing closing the open front thereof and re-directing light passing therethrough from said light source and said reflector, said refractor having a front panel formed with a centrally arranged prismatic sector extending upwardly a substantially distance from the bottom of said front panel and being wider at its lower portion than at its upper portion, said centrally arranged prismatic sector having opposite inner and outer surfaces and being formed with vertical refracting prisms on one of said surfaces and horizontal refracting prisms on the opposite surface, the remaining portions of said front panel having horizontal refracting prisms on opposite surfaces.

2. A device as defined in claim 1, said housing having means for mounting the luminaire selectively in vertical and horizontal positions.

3. A device as defined in claim 1, said refractor including top, bottom and opposite side panels extending rearwardly from said front panel, said top panel formed with reflecting prisms for re-directing in the opposite direction light received from said light source.

4. A device as defined in claim 3, said bottom panel having refracting prisms for spreading out below the luminaire the light rays received from said light source.

5. A device as defined in claim 4, said side panels being formed with refracting prisms for directing light rays from said light source downwardly and forwardly of the luminaire.

6. A device as defined in claim 1, said centrally arranged prismatic sector having vertical prisms on its outer surface and horizontal prisms on its inner surface.

7. A device as defined in claim 6, said vertical prisms having increasing refractive power from the center toward the sides of said sector.

8. A device as defined in claim 7, said vertical prisms in the narrower upper portion of said sector having lessening refractive power toward the top.

9. A device as defined in claim 6, said horizontal prisms on the inner surface of said sector depressing light rays incident on the upper portion of said sector and lifting light rays incident on the lower portion of said sector.

10. A device as defined in claim 9, the horizontal prisms on said remaining portions of said front panel depressing light rays passing therethrough, and being of increasing refractive power toward the top.

11. A device as defined in claim 1, said centrally arranged prismatic sector being substantially of inverted T-shape.

12. A device as defined in claim 1, said reflector having a paraboloidal reflecting surface with a downwardly slanting axis.

13. A device as defined in claim 12, said housing rim edge defining a plane tilted downwardly relative to the plane of said rear wall.

References Cited

UNITED STATES PATENTS

| | | | |
|---|---|---|---|
| 3,274,383 | 9/1966 | Dorman | 240—106 |
| 3,353,015 | 11/1967 | Franklin | 240—147 |
| 3,448,260 | 6/1969 | Wince et al. | 240—25 |
| 3,459,934 | 8/1969 | Moore | 240—53 |

FOREIGN PATENTS 728,013  2/1966  Canada.

NORTON ANSHER, Primary Examiner

T. A. MAURO, Assistant Examiner

U.S. Cl. X.R.

240—3, 53, 93, 103, 106